United States Patent [19]
Moore

[11] Patent Number: 5,985,133
[45] Date of Patent: Nov. 16, 1999

[54] CONTROL OF PARTICLE SIZE DISTRIBUTION IN AN FCC UNIT

[75] Inventor: Howard F. Moore, Catlettsburg, Ky.

[73] Assignee: Marathon Ashland Petroleum LLC

[21] Appl. No.: 09/110,530

[22] Filed: Jul. 6, 1998

Related U.S. Application Data

[60] Provisional application No. 60/052,333, Jul. 11, 1997.

[51] Int. Cl.[6] .............................. B01J 20/34; C10G 47/02; C10G 11/00
[52] U.S. Cl. ........................... 208/113; 208/106; 502/20; 502/21
[58] Field of Search ................................. 208/108, 113, 208/106; 502/20, 21

[56] References Cited

U.S. PATENT DOCUMENTS

| | | | |
|---|---|---|---|
| 2,994,659 | 8/1961 | Slyngstad et al. | 208/113 |
| 5,275,990 | 1/1994 | Clark et al. | 502/43 |
| 5,328,594 | 7/1994 | Hettinger | 208/121 |
| 5,393,412 | 2/1995 | Hettinger | 208/120 |
| 5,746,321 | 5/1998 | Hettinger et al. | 209/233 |

*Primary Examiner*—Walter D. Griffin
*Assistant Examiner*—Tam M. Nguyen
*Attorney, Agent, or Firm*—Richard D. Stone; Laurence P. Hobbes

[57] ABSTRACT

Circulating equilibrium catalyst (ECAT) in a fluidized catalytic cracking (FCC) is gently attrited in an internal or closely coupled attriter to produce fines and attrited catalyst which is recycled to the FCC unit for fines removal. Average particle size of the circulating ECAT is slightly reduced coupled with some fines formation, improving fluidization. Some metals removal is possible as metals tend to accumulate on the surface of the ECAT. The existing fines removal equipment in the FCC is used to remove produced fines, though operating conditions may be altered to reduce particulates emissions during periods of catalyst attrition. A dual orifice plate attriter closely coupled with and discharging into the FCC regenerator is preferred, but a high velocity gas jet within the FCC regenerator may also be used. The process operates without a magnetic catalyst separation unit.

6 Claims, 3 Drawing Sheets

CONTROL OF PARTICLE SIZE DISTRIBUTION IN AN FCC UNIT

This case was originally filed as provisional application Ser. No. 60/052,333 filed Jul. 11, 1997.

BACKGROUND OF THE INVENTION

I. Field of the Invention

The invention relates to Fluidized Catalytic Cracking (FCC).

II. Description of the Prior Art

Two significant, and somewhat related, problems that exist today in many FCC units are particulates emissions and fluidization. Particulate emissions are to a great extent a legislatively created problem. FCC's on average emit fewer particulates today than they did even a decade ago. Particulate emissions occur because the FCC process inherently produces catalyst fines, submicron and less than 5 micron sized particles which cannot be effectively captured even by modem high efficiency cyclones. Some of the fines end up in various products, typically as the slurry in the FCC slurry oil. Particulates there cause scouring in diesel engines which burn this oil as fuel, and cause quality control problems in plants which convert slurry oil into carbon black. At least no laws are broken if heavy liquid products have trace amounts of micron and submicron sized particulates.

Most fines produced in an FCC exit the unit with the flue gas from the regenerator. Many units use third stage separators, typically hundreds of small diameter cyclones, to capture the extremely fine particulates. Some FCC units employ wet scrubbers, electrostatic precipitators, or even baghouses to reduce particulates emissions. Thus modem FCC units are pretty good at removing fines produced by the FCC unit.

Much of the reduction of particulates emissions is due to the talents of people making the catalyst. Catalyst manufacturers have increased the durability of the catalyst used in the FCC process over the last fifty years, significantly reducing the amount of fines inherent from the use of such material. These advances, however, have not always been sufficient to meet ever more stringent limits set by law in many areas on particulates emissions. In further responding to this problem, many FCC catalyst manufacturers have increased the size of the FCC catalyst. The theory is that larger size particles are easier to retain in the system. The size of FCC catalyst, both as supplied by the manufacturer, and as it exists in inventory in the FCC unit, has gradually increased over the last 10 to 15 years. The average particle (APS) size of FCC catalyst has increased from an average particle size of perhaps 70 microns in the period 1983–1985, to a particle size in the range of 85–90 microns (1988–1990). Some units now run with an APS well above 90 microns.

The increased particulate size, or perhaps the more durable catalyst formulations, have helped to reduce particulates emissions. Unfortunately, the coarser, tougher catalysts were also making the FCC units harder to control and to run. The catalyst just does not fluidize and flow from reactor to regenerator and so on.

The problem was severe in some units. Some improvement in fluidization was achieved by addition of fluidization aids, material of 20–40 micron size whose primary function is to help coarse FCC catalyst circulate in the unit. Catalyst vendors sell this material.

U.S. Pat. No. 5,393,412 taught a "triangular" approach to catalyst management, taking some of the circulating ECAT out of the unit and preferably subjecting to classifying, attrition, and magnetic separation.

The magnetic separation, attrition, and screening approach of '412 patent gave refiners a way to change ECAT physical properties, but required a significant amount of processing of catalyst in attrition and separation means, in addition to magnetic separation. The '412 patent recognized the difficulty caused by coarse materials (burping of the bed and poor oil contact) and the beneficial effect of some fine particles. It summarized the state of the FCC art by stating:

"further it has been established by experience over many years by many refiners, that a particle distribution most preferably in the 40–80 micron range, as mentioned above, gives best overall performance."

While the approach disclosed in '412 will help significantly, it requires a significant capital and operating expense. This can be justified when processing a heavy, metals laden feed, but can not be justified when processing a clean feed. Refiners frequently just need a way to improve fluidization, especially on short notice if a batch of makeup catalyst is unusually coarse or if some unit upset causes a significant loss of fines causing fluidization difficulties.

Another concern with the "triangle" approach is that this expensive equipment is used fairly aggressively on a small fraction of the catalyst inventory. It takes months to turn over the inventory of an FCC in a magnetic separation unit, so there is a tendency to somewhat overtreat the modest fraction passed each day through the external processing facility. While this is probably the best use of the capital and operating expense of the external magnetic separation/grinding/sieving unit, it is probably overkill for the fraction removed and treated. Thus the grinding operation probably takes off an excessive amount of catalyst structure. If ECAT were children playing in mud, the triangle approach is akin to giving them a thorough scrubbing one a month or so when they can be found, whereas more frequent and milder treatment would be better for the individuals being subjected to such treatment.

I wanted to be able to treat a larger fraction of the catalyst inventory than is practical in most magnetic separation operations, but do less to each catalyst particle. For optimum handling and use of catalyst, my philosophy was roughly, treat more catalyst, but do less to each particle per treatment.

I discovered a gentler way to treat more of the ECAT. This new approach allows refiners to create fines, in situ, and on demand, so that FCC catalyst will have better catalyst circulation properties. This approach can be used to reduce average FCC catalyst particle size and even increase conversion to a limited extent. In units running with modest amounts of metals in the feed, the gentle approach provided a measure of demetallization of the catalyst by preferentially removing metals. Most of the metals, except for mobile vanadium species, deposit on the exterior of the catalyst. Abraiding off just a thin metals laden shell produces a metals enriched fines fraction which can be removed from the unit with the flue gas or the slurry oil and a smaller more readily fluidizable and somewhat demetallized ECAT. The metals rich fines will be then recovered using the technology already in place for fines recovery.

BRIEF SUMMARY OF THE INVENTION

Accordingly, the present invention provides a process for Fluidized Catalytic Cracking (FCC) of a hydrocarbon feed to lighter products comprising; mixing a crackable hydrocarbon feed with a source of circulating, hot regenerated equilibrium catalyst (ECAT) in a cracking reaction zone operating at cracking conditions to produce a mixture of spent catalyst and cracked products; separating said spent catalyst from said cracked products; removing said cracked products from said process; stripping spent catalyst in a catalyst stripping zone operating at by contact with stripping vapor to remove strippable hydrocarbons from said spent catalyst and produce stripped catalyst; regenerating, in a catalyst regeneration means at catalyst regeneration conditions said stripped catalyst by contact with oxygen or an oxygen-containing gas to produce regenerated ECAT which is recycled to said cracking reaction zone; at least periodically attriting ECAT in a catalyst attrition means to produce a mixture of fines and attrited ECAT and returning essentially all of said fines and attrited ECAT to said FCC unit, and wherein said FCC unit operates without any magnetic separation of catalyst.

DETAILED DESCRIPTION OF PREFERRED EMBODIMENTS

Figure 1:
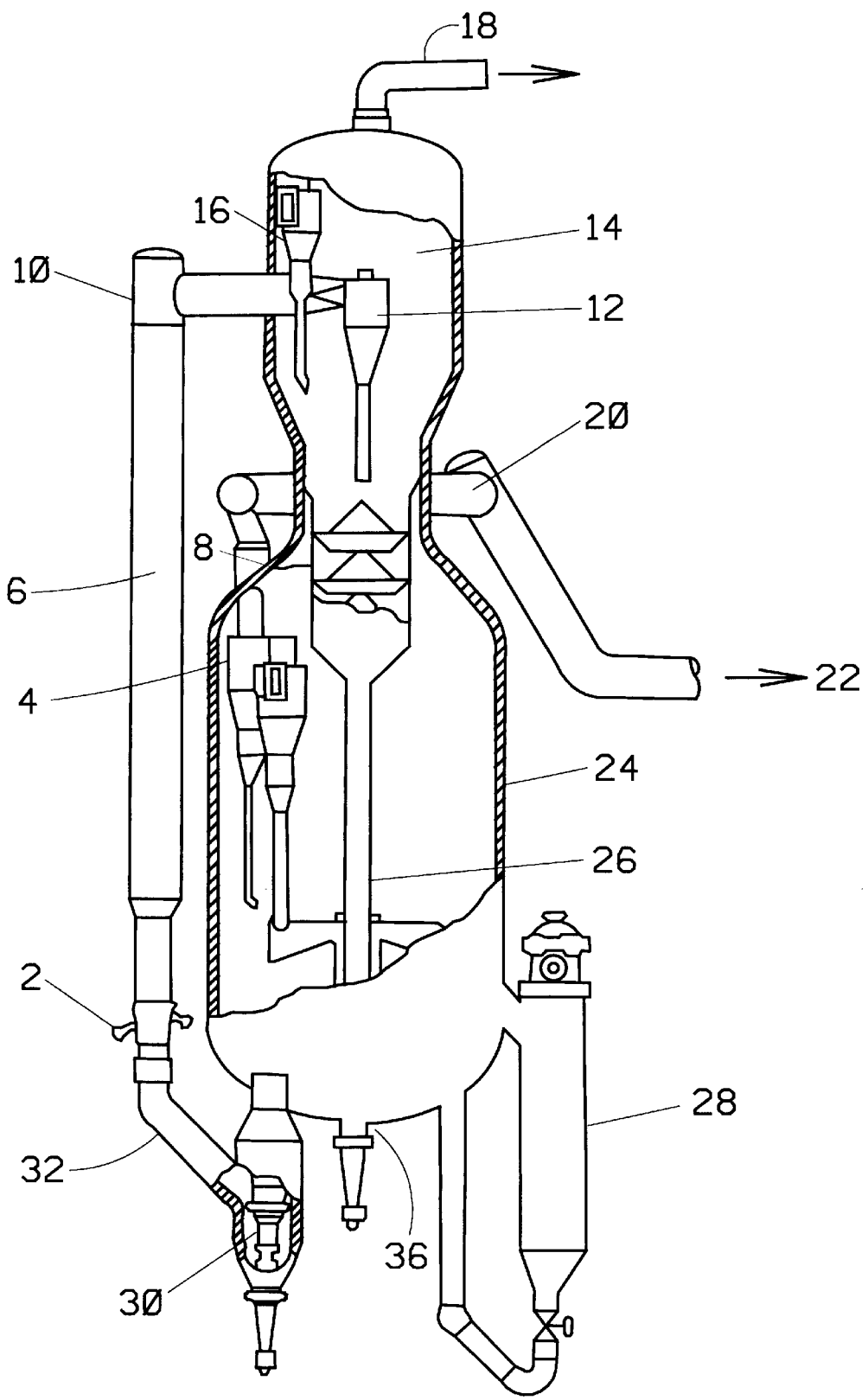
FIG. 1 is prior art—an FCC unit as shown in U.S. Pat. No. 5,376,261

FIG. 1 (Prior Art) shows the basic FCC process is well known and widely used. It is discussed at greater length in U.S. Pat. No. 5,376,271, which is incorporated by reference.

Figure 2:
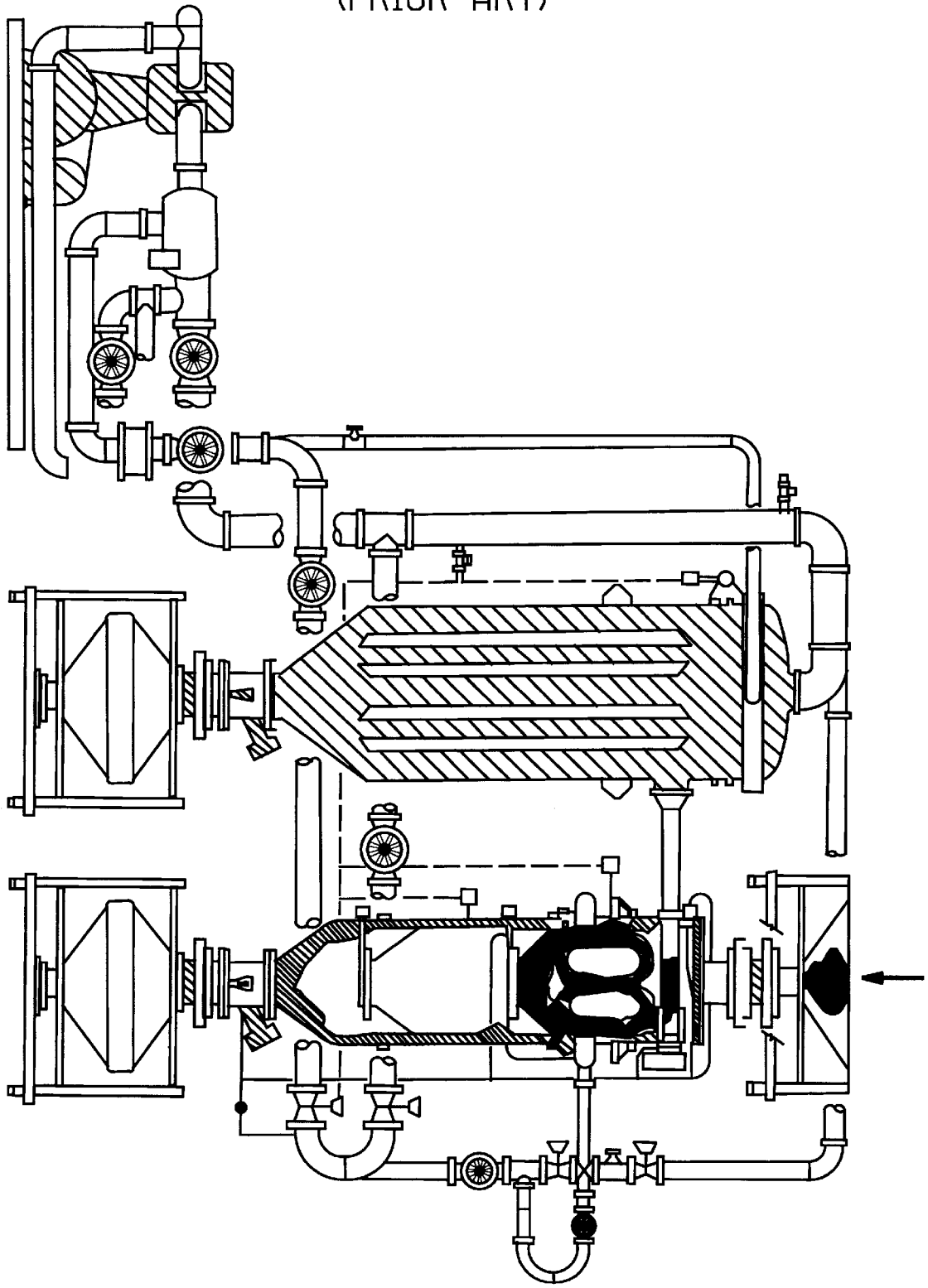
FIG. 2 is prior art—FIG. 19 of U.S. Pat. No. 5,393,412—a grinding unit for attriting FCC catalyst.

FIG. 2 (Prior Art) shows a grinding plant with compressed air supply embodying the Model AFG-100 Fine Grind Jet Mill, as shown in U.S. Pat. No. 5,393,412, which is incorporated by reference. This type of grinder is shown used as part of a "triangle" arrangement for processing of ECAT removed from an FCC regenerator.

The discussion which follows reviews how the grinder was used as part of a catalyst treatment approach involving magnetic separation, size classification, and attrition. This discussion says what FIGS. 1A and 1B of '412 shows.

Catalyst removed from an FCC regenerator passes through a magnetic separation unit such as a MagnaCat to yield a low metals catalyst fraction and a high metals catalyst fraction, both of which receive further processing.

Low metals catalyst goes to a classifier, which sends oversize material to the grinder to produce fines and ground catalyst. The ground catalyst mixture then passes back through the classifier, which rejects fines to disposal and recycles ground FCC catalyst to the FCC unit.

High metals catalyst goes directly to the grinder, which removes a metals rich layer from the catalyst to produce metals rich fines and ground catalyst which may have a high metals content even after grinding. The mix of ground catalyst and fines is returned to the magnetic separation unit.

The benefit of this treatment is an efficient control of metals levels and particle size of the FCC catalyst. The burden is the significant capital and operating expense and complexity of the process. While this approach can be justified where metals management is a problem, it is not economically justifiable when a refiner does not need a magnetic separation unit.

There are many FCC units processing clean feed which do not have a metal problem, or only a minor metals problem. Some units have no metals problem but have fluidization problems. For these units, the cost and complexity of the triangle approach of '412 can not be justified.

There are also some FCC units processing very dirty feeds which add purchased, low-metals equilibrium catalyst from other refiners, which can not use magnetic catalyst separation. This type of circulating catalyst, a mix of fresh and purchased ECAT, produces magnetically separated fractions which have high metals levels and significant catalytic activity.

Thus magnetic separation alone can be hard to justify when the feeds are very clean or very metals contaminated. The "triangle" approach is even harder to justify.

I realized that there were many FCC units with relatively clean feeds which had catalyst circulation problems. Sometimes the problems were short term (a new batch of relatively coarse catalyst arrived) or longer term (the FCC unit had problems retaining fines. There were also some units processing feeds with moderate levels of metals, enough to be troublesome, but not enough to justify the capital expense of a magnetic separation unit.

I discovered a way to achieve many of the benefits, at least as far as particle size distribution of ECAT was concerned, of the triangle approach of the '412 patent, but without any magnetic separator and without the cost and complexity of a size classifier.

I knew that the FCC unit was already equipped with efficient means for removing fines and retaining particles of smaller but useful size, e.g., 20–40 micron material. The existing cyclones, electrostatic precipitator, bag house, or third stage separator was expensive equipment which was already present. What was needed was a way to grind catalyst without the cost of an external grinder, and preferably in or near the FCC regenerator.

I discovered that essentially all of the benefits of grinding/classification could be achieved by close coupling of the grinder with the FCC unit, using the grinder either internally or externally without a size classifier. Catalyst was attrited in or near the FCC unit, and the entire fraction produced returned directly to the FCC unit. The fines produced are removed in the TSS, electrostatic precipitator or whatever equipment is currently used by the regenerator to recover fines produced naturally in the FCC.

In FCC units with a particulates emission problem, it is possible to practice the invention intermittently, i.e., reduce the superficial vapor velocity in the regenerator either by reducing air rate or using oxygen enriched air to reduce the load on the downstream regenerator gas treatment facilities, and/or reduce catalyst circulation and/or fresh feed rate. After sufficient fines have been created and removed to deal with a metals buildup or catalyst circulation problem normal operation may resume.

Figure 3:
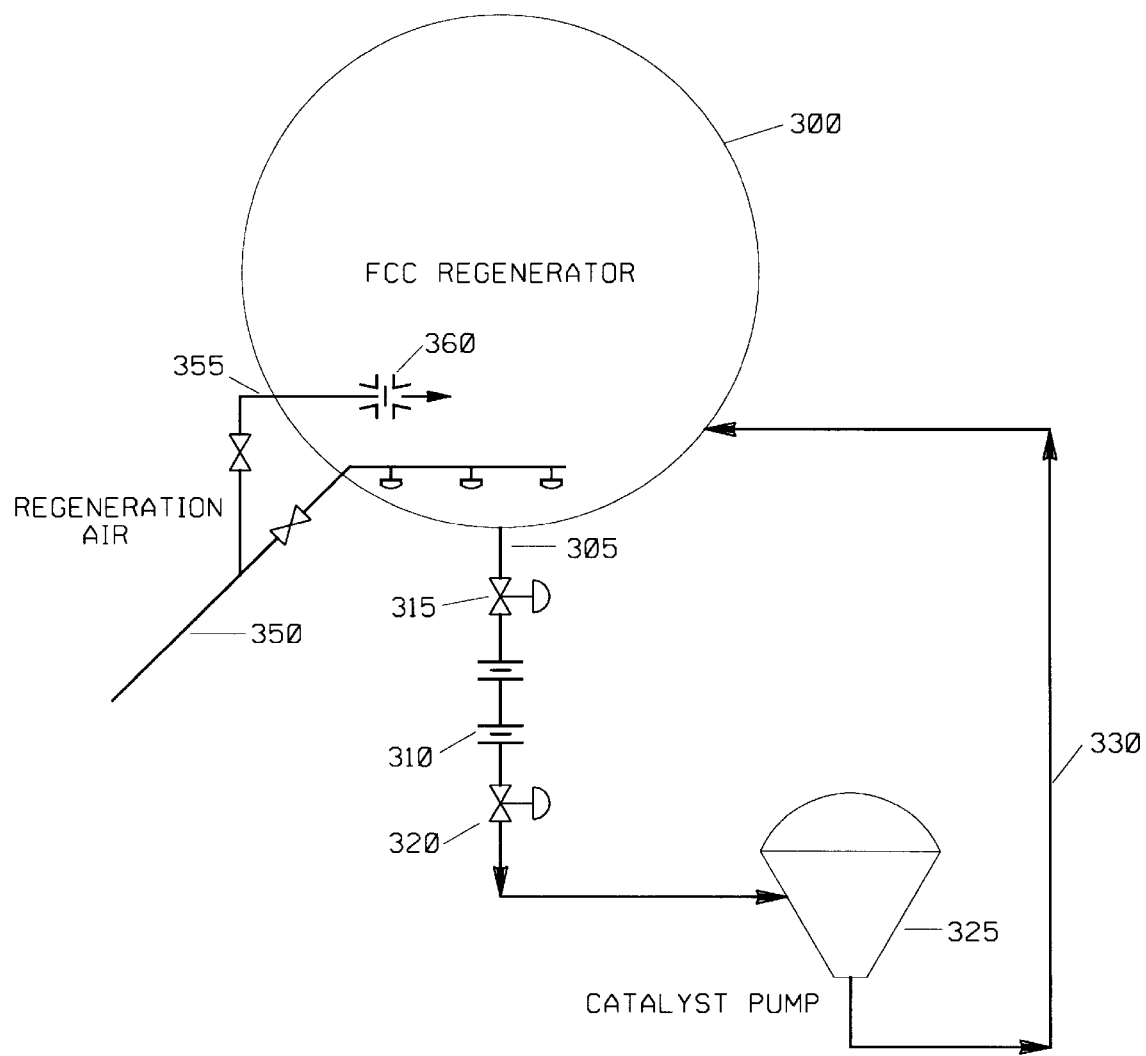
FIG. 3 is simplified illustration of an FCC regenerator with a preferred orifice plate attriter and also a gas jet attriter.

FIG. 3 shows one preferred embodiment, with a close coupled, external, dual orifice plate attriter and an internal high velocity gas jet attriter.

The FIG. 3 embodiment provides a dual orifice plate attriter 310 external to the FCC regenerator 300 which performs a mild abrasion process which gently removes only a small amount of each particle. For example, a slipstream of catalyst is withdrawn from the FCC inventory via line 305 and passed through a double set of orifice plates. The degree of particle size reduction can be modified by changing the flow rate of catalyst using valves 315 and/or 320, the pressure drop across the plates, the size of the orifices in the plates, and the distance between the plates, among others. The slipstream is collected in a hopper 325, which serves as a batch transfer device. When the hopper is full, valves automatically actuate which pneumatically transfer the catalyst back to the regenerator for reuse via line 330. Alternatively, the mild attrition can operate continuously.

EXAMPLE OF MILD ATTRITION

These data are from a test at our Canton, Ohio, refinery, in conjunction with a magnetic separator. Double orifice plates (½" and 5/16" orifice holes) were installed in a catalyst transfer line from the regenerator to a hopper. Approximately a 30 psig pressure drop was taken across the orifices, with the following change in catalyst particle size:

| Size Microns | FCC Regenerator | After Orifices |
| --- | --- | --- |
| 0–296 | 100 | 100 |
| 0–176 | 96 | 96 |
| 0–125 | 81 | 82 |
| 0–88 | 45 | 48 |
| 0–62 | 12 | 14 |
| 0–44 | 2 | 3 |

While these changes are small, that is specifically the heart of this invention—to provide a mild size reduction which does not make major changes in the particle size structure nor result in a large loss of particle mass.

Internal Attrition

In another embodiment, the present invention provides a similar attrition effect internal to the regenerator, with the added advantage of not requiring external transport of the catalyst. As shown in FIG. 3, a slipstream of compressed air supply to the regenerator air grid is routed via lines 350 and 355 through an eductor or similar apparatus 360 such that a small proportion of the regenerator catalyst inventory is picked up and carried through an orifice plate assembly. While this device is simpler and probably cheaper than the dual orifice plate, it has fewer parameters to change in order to set the desired particle size reduction. In practice, only the air flow and pressure drop are available to change for process control although the orifice and eductor sizes are externally changeable during turnarounds or maintenance.

Preferably, in commercial units, a relatively mild attrition is used, removing less than 10 wt % per pass of the outer surface of an average catalyst particle, and preferably less than 5 wt %, and most preferably less than 1 wt %.

Preferably there is a fairly large turnover of catalyst through the mild attrition process, with no more than 30 days required for 100% turnover. As used herein, turnover refers to catalyst inventory and average daily throughput through the attriter, so that a unit with 100 tons of catalyst inventory would process 3.3 tons per day of catalyst. Preferably turnover is less than 20 days, and most preferably less than 10 days. What is claimed is:

I claim:

1. A process for Fluidized Catalytic Cracking (FCC) in an FCC unit of a hydrocarbon feed to lighter products comprising:

a) mixing a crackable hydrocarbon feed with a source of circulating, hot regenerated equilibrium catalyst (ECAT) in a cracking reaction zone operating at cracking conditions to produce a mixture of spent catalyst and cracked products;

b) separating said spent catalyst from said cracked products;

c) removing said cracked products from said process;

d) stripping spent catalyst in a catalyst stripping zone operating by contacting with stripping vapor to remove strippable hydrocarbons from said spent catalyst and produce stripped catalyst;

e) regenerating, in a catalyst regeneration means at catalyst regeneration conditions said stripped catalyst by contact with oxygen or an oxygen-containing gas to produce regenerated ECAT which is recycled to said cracking reaction zone; at least periodically attriting ECAT in a catalyst attrition means to produce a mixture of fines and attrited ECAT and returning essentially all of said fines and attrited ECAT to said FCC unit, and wherein said FCC unit operates without any magnetic separation of catalyst wherein said catalyst attrition means are selected from the group consisting of 1). a dual orifice plate attriter receiving at an inlet thereof a fluidized stream of ECAT which is depressured through a first orifice plate to discharge against a second orifice plate and 2). a high velocity fluid nozzle within a dense bed region of said catalyst regeneration means which discharges fluid at a velocity in excess of 100 feet per second.

2. The process of claim 1 wherein said attrition means comprises a high velocity fluid nozzle within a dense bed region of said catalyst regeneration means which discharges fluid at a velocity in excess of 200 feet per second to produce fines and attrited catalyst.

3. The process of claim 1 wherein said ECAT is removed from and fines and attrited ECAT are returned to said catalyst regeneration means.

4. The process of claim 1 wherein said catalyst regeneration means operates with a regenerator air distribution system designed to uniformly distribute air within said regenerator and from 2 to 20 % of the regeneration gas added to said regenerator is via said attrition means.

5. The process of claim 1 wherein said catalyst experiences a pressure drop of 10–50 psi across said first orifice.

6. The process of claim 1 wherein said catalyst regeneration means operates with a superficial vapor velocity and said superficial vapor velocity is reduced at least 20 % during periods of catalyst attrition.

* * * * *